United States Patent [19]

Mercik, Jr. et al.

[11] 4,062,231

[45] Dec. 13, 1977

[54] ENGINE COOLING SYSTEM DIAGNOSTICS

[75] Inventors: Henry J. Mercik, Jr.; Lee R. Armstrong, both of Enfield, Conn.

[73] Assignee: United Technologies Corporation, Hartford, Conn.

[21] Appl. No.: 684,218

[22] Filed: May 7, 1976

[51] Int. Cl.² .............................................. G01L 3/00
[52] U.S. Cl. .................................................... 73/116
[58] Field of Search .................... 73/116, 117.3, 118, 73/119, 168; 324/16 R, 161; 235/150.2, 150.3; 116/114 AE

[56] References Cited

U.S. PATENT DOCUMENTS

| | | | |
|---|---|---|---|
| 2,612,777 | 10/1952 | Greer | 73/168 |
| 3,292,427 | 12/1966 | Mattson | 73/118 |

Primary Examiner—James J. Gill
Assistant Examiner—Anthony V. Ciarlante
Attorney, Agent, or Firm—M. P. Williams

[57] ABSTRACT

A single pressure transducer tapped into the cooling system of an engine, downstream of the pump, is used to measure coolant pressure at high idle and coolant pressure at low idle while the water temperature is such as to assure the thermostat is closed; the pressure readings are equivalent to the pressure across an orifice or restriction formed by the coolant bypass when the thermostat is closed; the combination of high idle pressure and difference between high idle pressure and low idle pressure permit diagnosing whether the pump is faulty or whether there is unduly large restriction in the engine, which otherwise could not be known with a single pressure reading.

6 Claims, 5 Drawing Figures

ENGINE COOLING SYSTEM DIAGNOSTICS

CROSS REFERENCE TO RELATED APPLICATIONS

The present invention employs some of the matter disclosed and claimed in commonly owned copending applications filed on even date herewith by Willenbecher et al, Ser. No. 684,036, entitled SPEED-RELATED INDICATION COMPARISONS IN INTERNAL COMBUSTION ENGINE DIAGNOSTICS; by Rackliffe et al, Ser. No. 684,220, entitled SUB-CYCLIC MEASUREMENT OF SPEED OF AN INTERNAL COMBUSTION ENGINE; and by Stick et al, Ser. No. 684,037, entitled DETERMINATION OF NUMBER OF TEETH ON AN INTERNAL COMBUSTION ENGINE FLYWHEEL.

BACKGROUND OF THE INVENTION

1. Field of the Invention

This invention relates to diagnosing internal combustion engines electronically.

2. Description of the Prior Art

One of the subsystems on a vehicle mounted engine which is critical to continuing engine health is the cooling system. In diesel engines, coolant must flow adjacent the cylinder jackets or the engine will disintegrate quite rapidly. The water temperature does not get too hot, so a very primary concern is the condition of the coolant pump; that is, is the coolant pump healthy and does it deliver a suitable mass flow rate of coolant at a suitable pressure; and another primary concern is whether the coolant passages in the engine have become restricted. The principle tests for these conditions in the prior art is measuring pressure ratios across the pump and across the engine at specific speeds while the engine-related vehicle is loaded by a dynomometer. Obviously, the use of a dynomometer is not always possible; further, dynomometers are extremely expensive and cumbersome and should be avoided if possible.

SUMMARY OF THE INVENTION

The object of the present invention is to provide improved diagnostics for an internal combustion engine cooling system.

The invention is predicated in part on the discovery that the pressure upstream of the coolant system bypass with the thermostat closed can be utilized as a measure of mass flow of coolant, and therefore of coolant pump health; and in part on the discovery that the difference in such pressure at a high speed and a low speed as well as the high speed pressure allows determination of probable cause for a low reading of high speed pressure.

According to the present invention, temperature of the coolant is measured to insure that the thermostat of a coolant system of an internal combustion engine is closed, and the pressure of the coolant between the pump and the bypass measured at high and low speeds is used to diagnose the health of the cooling system.

The invention avoids the necessity for multiple pressure sensors, which are very expensive, by permitting use of but a single pressure sensor. The invention also allows testing of the pressure at a point which is highly accessible: specifically, at the thermostat inlet. The invention provides an indication of pump health and of engine coolant passage restriction by testing pressure at a single point in the cooling system.

The foregoing and other objects, features and advantages of the present invention will become more apparent in the light of the following detailed description of a preferred embodiment thereof, as illustrated in the accompanying drawing.

DESCRIPTION OF THE PREFERRED EMBODIMENTS

Figure 1:
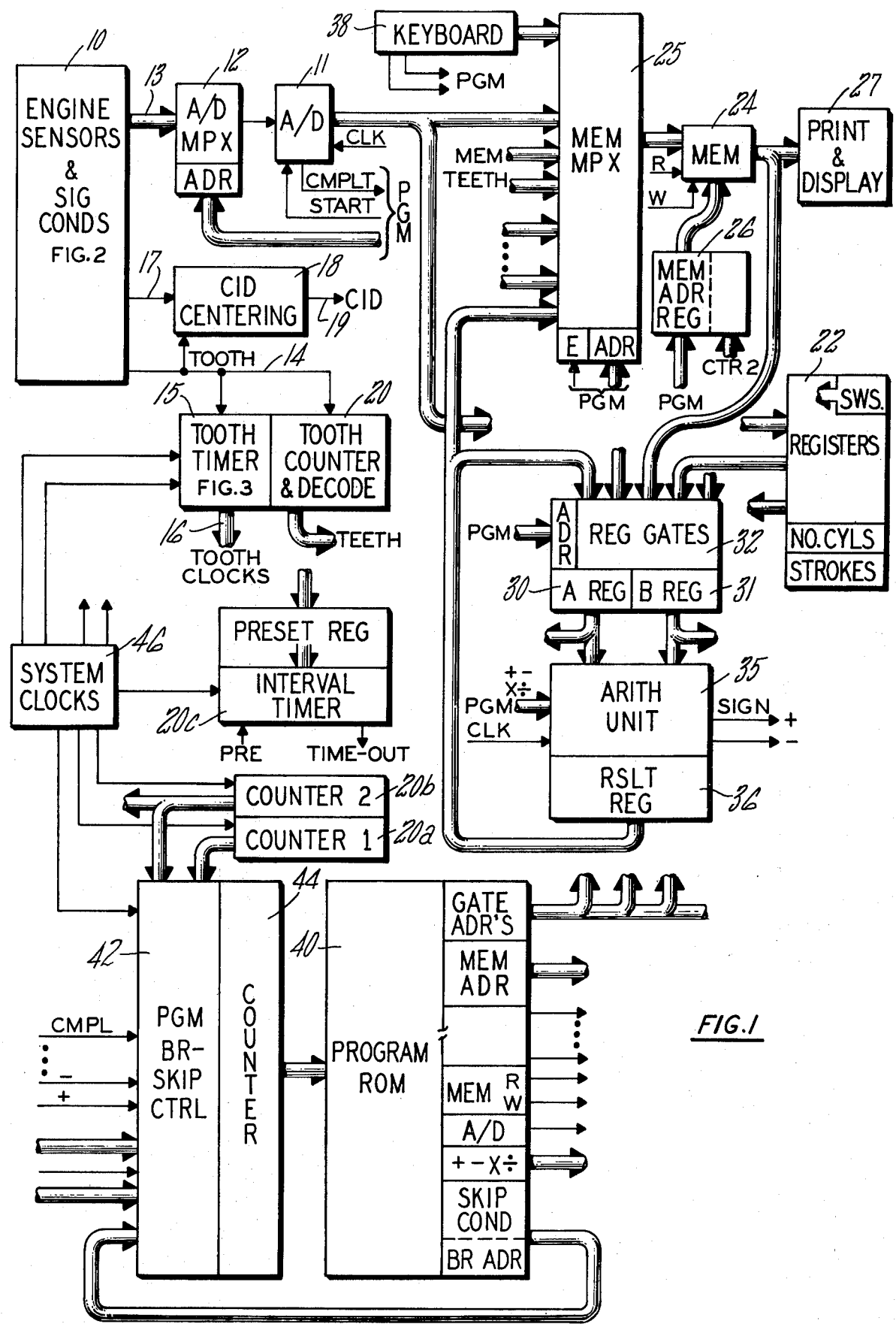
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
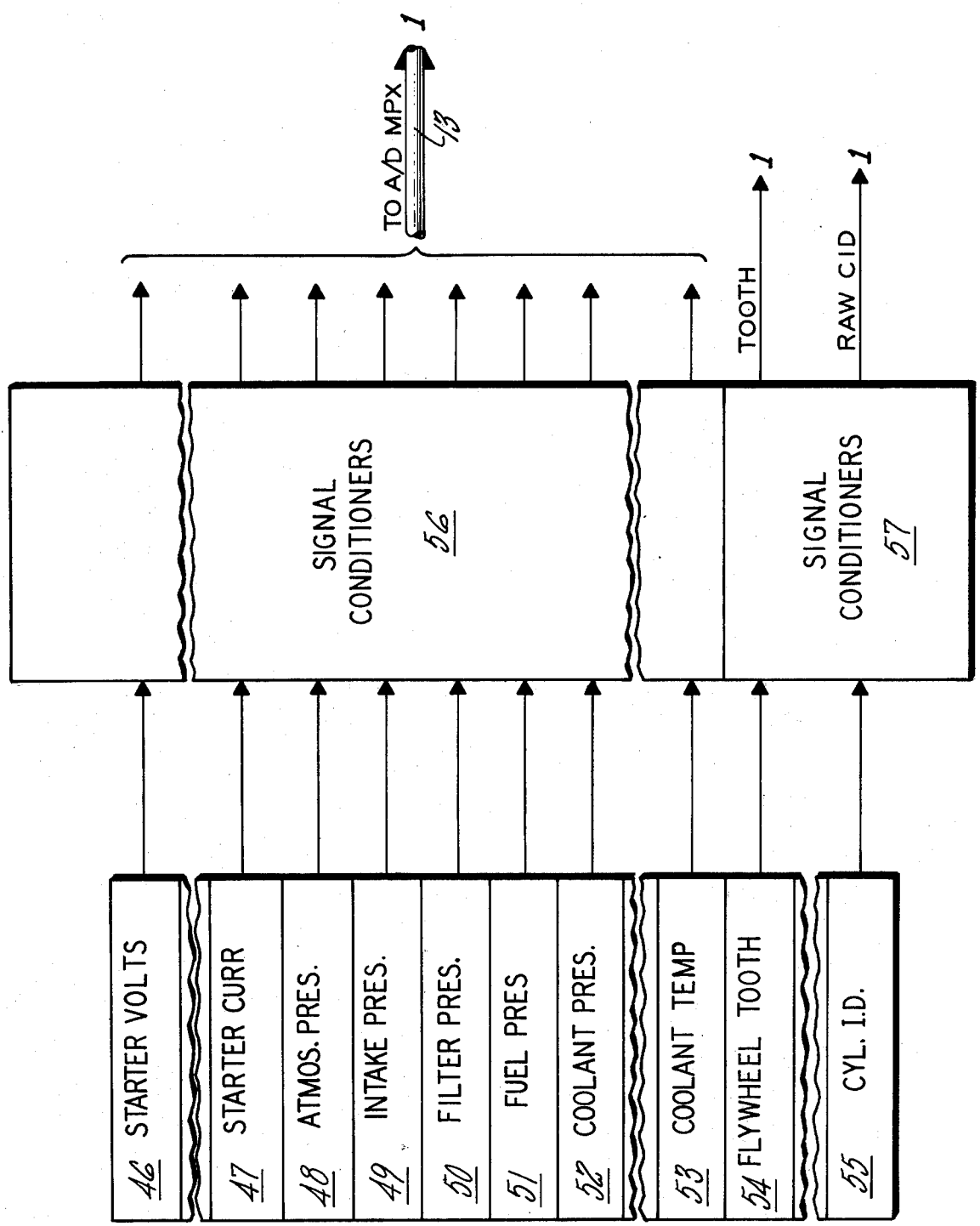
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
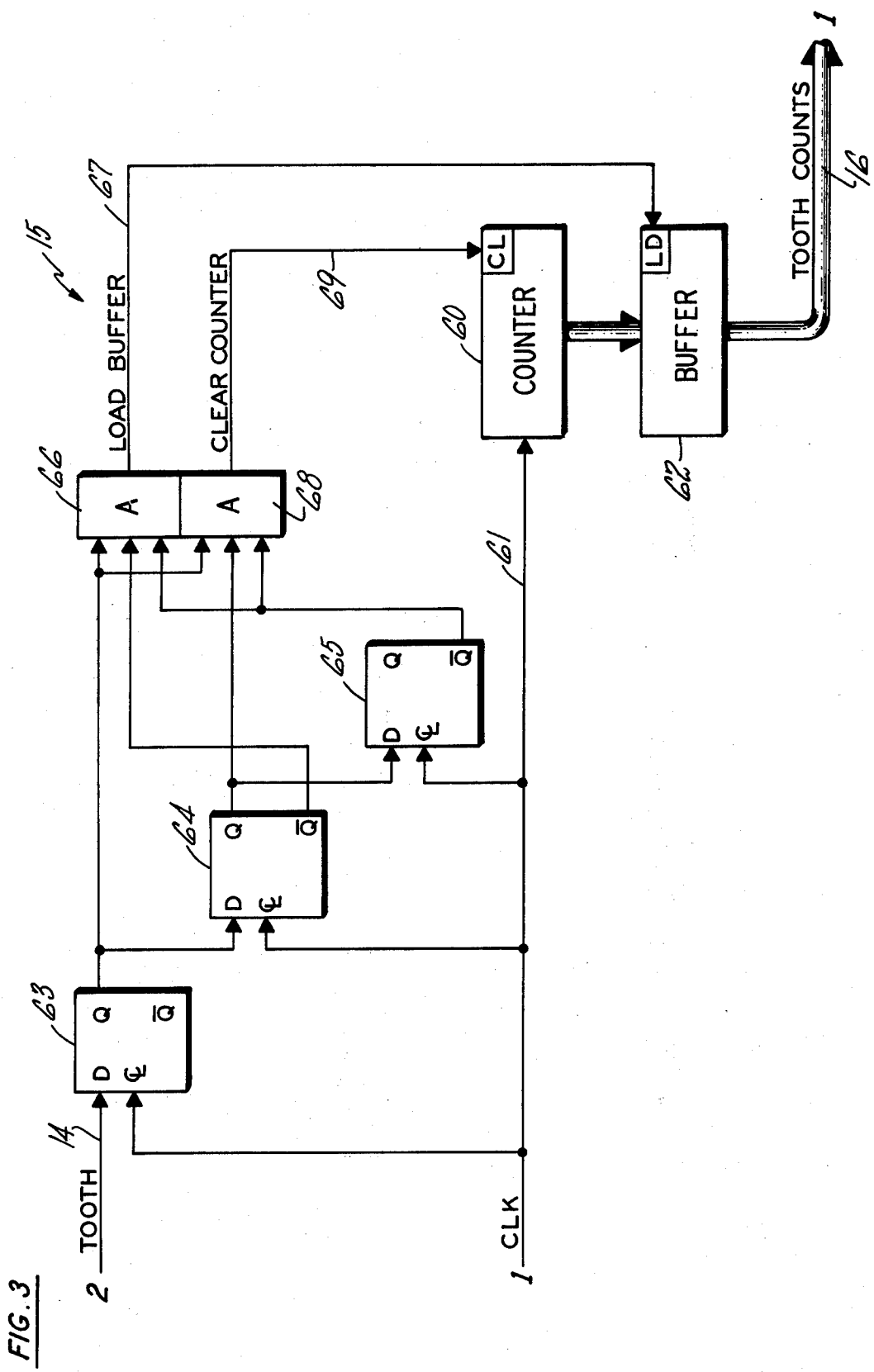
FIG. 3 is a simplified schematic diagram of tooth timer means for obtaining instantaneous, sub-cycle engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63-65, in turn, since each of their D inputs will go down. The counter and the buffer are independent of the resetting of the flip flops 63-65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al, Ser. No. 684,037, entitled "Determination of Number of Teeth on an Internal Combustion Engine Flywheel". Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

Figure 5:
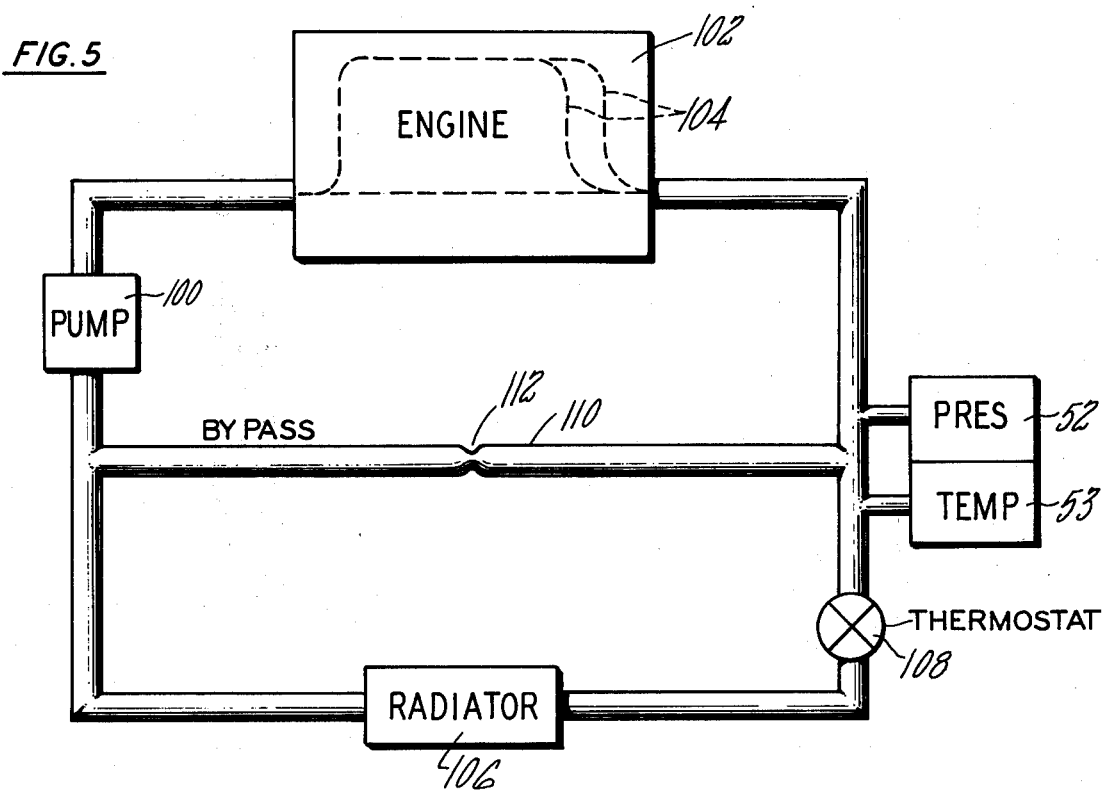
FIG. 5 is a simplified block diagram of the cooling system of an engine with probes which may be used in a diagnostic system incorporating the invention.

Referring now to FIG. 5, an exemplary cooling system of an engine includes a coolant pump 100, an engine 102 having coolant passages 104 therein, a radiator 106, a thermostat 108 to control flow of coolant to the radiator, and a bypass 110 which bypasses the coolant back to the pump when the thermostat is closed. As indicated by a notch 112 in the bypass 110, the bypass can be considered to be a restriction or an orifice such that the pressure across it will provide an indication of the flow through it, as is known in the art. Since the pressure at the inlet to a pump such as the pump 100 is extremely low compared to the output pressure thereof, the pressure at the thermostat 108 can be considered, in accordance with the invention, to be indicative of the pressure across the restriction represented by the bypass 112. Therefore, the coolant pressure transducer 52 can be tapped in near the thermostat inlet to provide indications of cooling system health. In order to insure that the thermostat is closed, temperature may be sensed at the thermostat inlet by the coolant temperature transducer 53.

Figure 4:
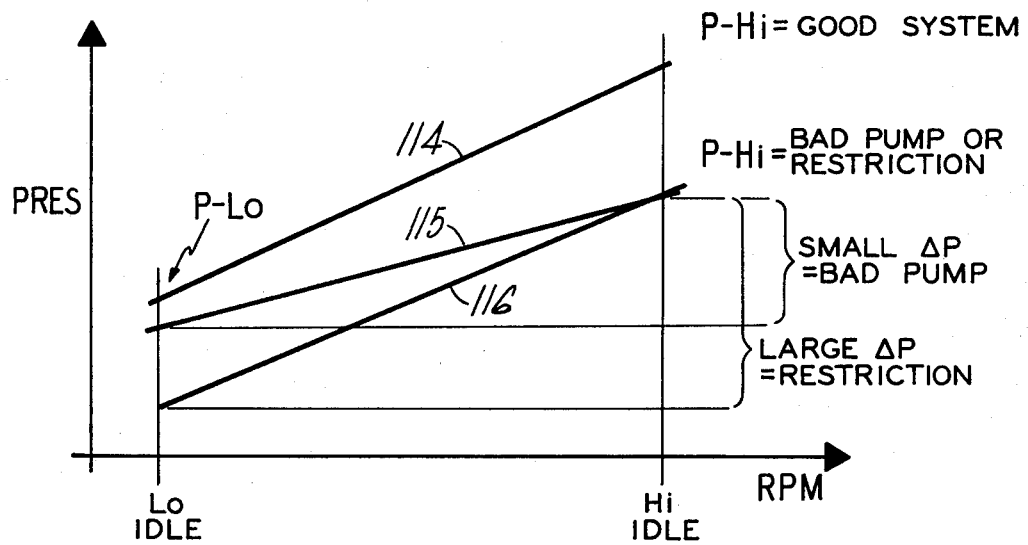
FIG. 4 is a diagramatic illustration of principles of the invention.

Referring to FIG. 4, several plots 114-116 of pressure as a function of speed are shown. The plot 114 shows the pressure rise with speed of a good cooling system, having a healthy pump and no undue restriction in the coolant passages of the engine. The plot 115 shows the pressure rise with speed for a cooling system in which there is no undue restriction in the engine but the pump capacity is impaired. And the plot 116 shows the rate of pressure rise with speed for a system in which the pump is healthy but there is an undue restriction in the engine passages.

If the pressure were measured at only one point, it would be impossible to determine whether a low pressure reading was caused by a bad pump or by excessive engine passage restriction. The present invention measures the pressure at low idle (P-Lo) and measures the pressure at high idle (P-Hi) and uses as an indication of cooling system health P-Hi and the difference between P-Hi and P-Lo (hereinafter referred to as the difference, D).

The tests herein are made by accelerating the engine to high idle and starting the test, and when the test is complete (or after a second or so) allowing the engine to decelerate to low idle. When at high idle, the speed is checked, and then the temperature is checked to see if it is between 140° and 160°, and then the pressure measurement is made. After decelerating, the temperature is again checked to see if it is within the aformentioned range, and the speed is checked to see if it is in a range between 600 and 900 rpm, although this range can be adjusted, and the pressure is once again read.

The speed measurements are made herein by the tooth sensor and timer, which sense the passage of teeth and record a count of the number of clock signals fed to the counter on a tooth-to-tooth basis. The number of flywheel and made or ringgear teeth (RGT) can be determined from manufacturer's specifications and provided in either a register or a predetermined location in memory prior to the test. Or, if desired, the teachings of the aformentioned Stick et al application may be utilized to determine the number of ringgear teeth on the flywheel, available in memory; none of this forms any part of the present invention. The fraction of a revolution traversed as each tooth passes the sensor is simply the ratio of one divided by the total number of teeth. The time for that fraction of a revolution to occur is simply the counts of the interval timer divided by the frequency of clock signals fed to the interval timer. Since frequency of the clock feeding the counter is expressed in Hz, and speed is normally expressed in revolutions per minute, a factor of 60 must be employed in a well known fashion. To actually determine the speed from the counts provided by the tooth counter the relationship is the ratio of one tooth to the total number of teeth, which is divided by the ratio of the counts to the frequency (the frequency in turn having to be first divided by 60 to yield a result in rpm's). When comparing the actual speed of the engine as determined by the tooth timer with predetermined speeds (such as low idle and high idle speed herein) the position of speed and counts in the relationships described hereinbefore can be reversed, and the number of counts which the tooth timer will have when the engine has a predetermined speed can be precalculated and ready to use. This is done generally by multiplying the frequency of the clock times 60, all of which is divided by the product of the total number of teeth on the flywheel and the desired starting speed in rpm. This can be accomplished in the exemplary diagnostic system of FIG. 1, assuming the specificiation speeds (low idle of about 800 rpm and high idle of about (2200 rpm) are available in memory, with the following instructions; and since only a single test need be made at high idle, and the low idle factor can be computed as the engine decelerates, the speed factor can simply be saved in the B register, and then the tooth timer can be compared therewith as follows:

1. Load MEM (Freq) TO A REG
2. Load MEM (RGT) to B REG
3. Divide
4. Load RSLT to A REG
5. Load MEM (2200 RPM) to B REG
6. Divide
7. Load RSLT to A REG
8. Load 60 Factor to B REG
9. Multiply
10. Load RSLT to B REG
11. Load Tooth timer to A REG
12. Subtract
13. Skip one if −
14. Branch to 11

Having checked to see that the engine is idling above rated speed, the system will now check to see that the temperature of the coolant is between 140° and 160°, and the following exemplary process assumes that factors are available in memory which are representative of these temperatures for comparison purposes, in a well known fashion. Exemplary instructions are:

15. Load MEM (160 Factor) to A REG
16. A/D MPX to Coolant Temp
17. Start A/D
18. Skip one if CMPLT
19. Branch to 18
20. Load A/D to B REG
21. Subtract
22. Skip two if −
23. Display Error
24. End
25. Load MEM (140 Factor) to A REG
26. Subtract
27. Skip one if +
28. Branch to 24

Having determined that the speed and temperature are proper, the system can now measure the high speed coolant pressure as follows:

29. A/D MPX to Coolant Pres
30. Start A/D
31. Skip one if CMPLT
32. Branch to 31
33. Load A/D to MEM (P-Hi)
34. Display "LO"

The last instruction is simply indicative of instructions which may be used to indicate to the operator that the high speed test is completed and that he can allow the engine to decelerate to low idle for the next test. However, since the electronic processing herein is so fast, there is no need of this because the operator can simply raise the engine to high idle, leave it for a second, and then allow it to return to low idle. The system will then check to see that the engine is at low idle in a manner similar to that described hereinbefore, except this time it tests against a window of speeds which are taken herein for example only as between 600 and 900 rpm, as follows:

35. Load MEM (Freq) to A REG
36. Load MEM (RGT) to B REG
37. Divide
38. Load RSLT to A REG
39. Load MEM (900 RPM) to B REG
40. Divide
41. Load RSLT to A REG
42. Load 60 Factor to B REG
43. Multiply
44. Load RSLT to B REG
45. Load Tooth timer to A REG
46. Subtract 47. Skip one if +
48. Branch to 23

And then a second test is made at a lower rpm which is taken herein to be on the order of 600 rpm as follows:

49. Load MEM (Freq) to A REG
50. Load MEM (RGT) to B REG
51. Divide
52. Load RSLT to A REG
53. Load MEM (600 RPM) to B REG
54. Divide
55. Load RSLT to A REG
56. Load 60 Factor to B REG
57. Multiply
58. Load RSLT to B REG
59. Load Tooth timer to A REG
60. Subtract; Skip one if −
61. Branch to 23

Then the temperature is again checked in the same fashion as before:

62–75. (Same as 15–28.)

And the pressure is read once more, this time at low speed, according to the following instructions:

76. A/D MPX to Coolant Pres
77. Start A/D
78. Skip one if CMPLT
79. Branch to 78
80. Load A/D to MEM (P-Lo)

And if desired, the pressure difference can be measured at this time as follows:

81. Load A/D to B REG
82. Load MEM (P-Hi to A REG
83. Subtract
84. Load RSLT to MEM (P-Lo)

Thereafter, such use as is desired can be made of the pressure and the pressure difference. For instance, either one could be compared against standards which have been emperically determined for the type of engine under test, to give an indication of passage or failure. On the other hand, the diagnostician can simply look at the two numbers and from experience analyze the condition of the pump and the coolant passages in the engine. As examples, typical results for testing an engine in the manner illustrated briefly hereinbefore with respect to FIG. 5 could include a good system P-Lo of 10 psia and a good system P-Hi of 35 psia, a bad system P-Hi of 20 psia, a bad pump P-Lo of 8 psia, and a P-Lo relating to excessive restriction of about 2 psia. Therefore, if P-Hi is on the order of 35 psia and the difference between P-Hi and P-Lo is on the order of 25 psia, a healthy system can be assumed. On the other hand, if P-Hi is around 20 psia the system is known to be faulty and depending upon the difference between P-Hi and P-Lo, if it is almost the same pressure as P-Hi, then an excessive restriction can be assumed but if it is much lower than P-Hi, a bad pump can be assumed.

It should be understood that the particular processing apparatus and the exemplary program steps therefor set out hereinbefore form no part of the present invention. The invention may be implemented in a wide variety of ways well within the skill of the art. For instance, tests of this type, if not being performed in an overall diagnostic system of the general type described with respect to FIG. 1 hereinbefore, may be more practical to implement with analog measuring apparatus. But if a high degree of resolution and sophistication is desired, then the digital techniques described herein may be preferable. Obviously, the present test alone could be performed with special purpose digital equipment which is far simpler than the overall system described hereinbefore. Similarly, although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which we claim as new and desire to secure by Letters Patent is:

1. In the method of diagnosing the cooling system of an engine, the steps of:
    operating the engine at substantially a low idle speed and at substantially a high idle speed;
    determining that the thermostat in the cooling system is closed; and
    at each of the speeds measuring the coolant pressure between the pump and the thermostat.

2. The method according to claim 1 wherein said determining step comprises determining that the thermostat is closed just prior to taking measurements at the high speed and also just prior to taking measurements at the low speed.

3. The method according to claim 1 wherein only one pressure measurement is made at each speed.

4. In the method according to claim 1, the additional step of:
    determining the difference between the pressure taken at the high speed and the pressure taken at the low speed.

5. Apparatus for diagnosing the cooling system of an engine having a thermostat bypass while operating at each of two different speeds including substantially low idle speed and substantially high idle speed with the thermostat closed, comprising:
    pressure sensor means adapted to be disposed to sense the pressure of the coolant between the outlet of the pump and the inlet of the thermostat of the cooling system, and providing a pressure signal in response thereto;
    speed sensor means adapted to be disposed to sense rotation of the engine and provide a speed signal indicative of the speed of rotation of the engine;
    temperature sensor means adapted to be disposed for response to the temperature of the coolant in said cooling system, and providing a temperature signal in response thereto; and
    processing apparatus comprising means operative with all of said sensor means disposed as described hereinbefore responsive to said speed signal for respectively determining that the engine has a speed in excess of substantially a high idle speed in one case and for determining that the engine has a speed in a range including substantially a low idle speed in another case, and also responsive to said temperature signal for verifying that the thermostat is closed in each case and, in response thereto, providing in each case a pressure manifestation indicative of the coolant pressure between the outlet of the pump and the inlet of the thermostat, as represented by said pressure signal respectively corresponding to the high idle speed and to the low idle speed.

6. Apparatus according to claim 5 wherein said processing apparatus also comprises:
    means for providing a signal indicative of the difference between the pressure represented by said pressure signal at the high idle speed and the pressure represented by said pressure signal at the low idle speed.

* * * * *

UNITED STATES PATENT AND TRADEMARK OFFICE
CERTIFICATE OF CORRECTION

PATENT NO. : 4,062,231
DATED : December 13, 1977
INVENTOR(S) : Henry J. Mercik, Jr.; Lee R. Armstrong It is certified that error appears in the above-identified patent and that said Letters Patent are hereby corrected as shown below:

Column 1, line 34     "principle" should read --principal--

Column 2, line 19     "diagramatic" should read --diagrammatic--

Column 7, line 26     "flywheel and made or ringgear" should read --flywheel or ringgear--

Column 7, line 33     "flywheel, available" should read --flywheel, and made available--

Signed and Sealed this

Twenty-second Day of August 1978

[SEAL]

Attest:

RUTH C. MASON
*Attesting Officer*

DONALD W. BANNER
*Commissioner of Patents and Trademarks*